(12) United States Patent
Murata et al.

(10) Patent No.: US 11,407,452 B2
(45) Date of Patent: Aug. 9, 2022

(54) VEHICLE BODY STRUCTURE MEMBER

(71) Applicant: Toyota Jidosha Kabushiki Kaisha, Toyota (JP)

(72) Inventors: Soshiro Murata, Nagoya (JP); Ayaka Kagami, Inazawa (JP); Takashi Sagisaka, Miyoshi (JP); Yu Sasaki, Okazaki (JP); Shinichi Arimoto, Okazaki (JP); Koh Hirokawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 145 days.

(21) Appl. No.: 16/721,137

(22) Filed: Dec. 19, 2019

(65) Prior Publication Data

US 2020/0231213 A1 Jul. 23, 2020

(30) Foreign Application Priority Data

Jan. 23, 2019 (JP) .............................. JP2019-009623

(51) Int. Cl.
| | |
|---|---|
| *B62D 25/08* | (2006.01) |
| *B62D 29/00* | (2006.01) |
| *B62D 21/08* | (2006.01) |
| *B62D 21/15* | (2006.01) |

(52) U.S. Cl.
CPC ............. *B62D 25/08* (2013.01); *B62D 21/08* (2013.01); *B62D 21/152* (2013.01); *B62D 29/008* (2013.01)

(58) Field of Classification Search
CPC ...... B62D 21/08; B62D 21/152; B62D 25/08; B62D 25/2036; B62D 29/008

USPC ............. 296/187.01, 187.03, 187.11, 193.08
See application file for complete search history.

(56) References Cited

U.S. PATENT DOCUMENTS

| | | | | |
|---|---|---|---|---|
| 5,496,067 A | * | 3/1996 | Stoll ..................... | B62D 21/07 |
| | | | | 280/781 |
| 6,296,300 B1 | | 10/2001 | Sato | |
| 9,828,037 B2 | * | 11/2017 | Alanis .................. | B62D 25/087 |
| 10,000,238 B2 | * | 6/2018 | Buschjohann ......... | B62D 21/08 |
| 10,710,644 B2 | * | 7/2020 | Kim ...................... | B62D 21/03 |
| 2006/0284449 A1 | | 12/2006 | Miyahara | |
| 2014/0300126 A1 | * | 10/2014 | Ehrlich ................ | B62D 25/025 |
| | | | | 296/29 |
| 2015/0166104 A1 | | 6/2015 | Ohhama et al. | |

(Continued)

FOREIGN PATENT DOCUMENTS

| | | |
|---|---|---|
| CN | 104507784 A | 4/2015 |
| DE | 102013221512 A1 | 4/2015 |

(Continued)

OTHER PUBLICATIONS

Molding Design Guidelines; retrieved Dec. 20, 2021, located at http://exploringcad.blogspot.com/2009/03/plastic-componets-design-considerations.html. (Year: 2009).*

*Primary Examiner* — Jason S Daniels
(74) *Attorney, Agent, or Firm* — Dinsmore & Shohl LLP

(57) ABSTRACT

Provided is a vehicle body structure member molded by a die. The vehicle body structure member includes a general portion constituting a main part of the vehicle body structure member, ribs provided in a standing manner from the general portion, and thickened portions provided in a standing manner from the general portion, each of the thickened portions being thicker than each of the ribs.

8 Claims, 6 Drawing Sheets

(56) References Cited

U.S. PATENT DOCUMENTS

2017/0057558 A1\* 3/2017 Hillebrecht .............. B22F 5/10
2017/0073010 A1 3/2017 Alanis et al.

FOREIGN PATENT DOCUMENTS

| DE | 112013003701 T5 | 4/2015 |
| JP | 2001-030961 A | 2/2001 |
| JP | 2006-347464 A | 12/2006 |
| JP | 2012-136195 A | 7/2012 |

\* cited by examiner

VEHICLE BODY STRUCTURE MEMBER

CROSS-REFERENCE TO RELATED APPLICATIONS

This application claims priority to Japanese Patent Application No. 2019-009623 filed on Jan. 23, 2019, which is incorporated herein by reference in its entirety including the specification, drawings and abstract.

BACKGROUND

1. Technical Field

The present disclosure relates to a vehicle body structure member.

2. Description of Related Art

Japanese Unexamined Patent Application Publication No. 2001-030961 (JP 2001-030961 A) describes a technique related to a vehicle body structure in which a front side member is connected to a floor member via a member (hereinafter referred to as "vehicle body structure member") formed by aluminum die-casting and having a closed section portion. In the above related art, ribs are formed in a truss shape in the closed section portion of the vehicle body structure member and improves rigidity.

SUMMARY

However, in the related art, when a collision load is input into the vehicle body structure member along the vehicle front-rear direction, the closed section portion might break by greatly bending and deforming due to the occurrence of a bending moment.

In consideration of the above fact, the present disclosure provides a vehicle body structure member that can restrain bending deformation at the time of input of a collision load.

A vehicle body structure member according to one aspect of the present disclosure is a vehicle body structure member molded by a die. The vehicle body structure member includes a general portion, ribs, and thickened portions. The general portion constitutes a main part of the vehicle body structure member. The ribs are provided in a standing manner from the general portion. The thickened portions are provided in a standing manner from the general portion, and each of the thickened portions is thicker than each of the ribs.

With the configuration, it is possible to yield such an effect that bending deformation can be restrained at the time of the input of a collision load.

In the above aspect, the ribs may include cross ribs extended along a vehicle front-rear direction and longitudinal ribs extended along a vehicle up-down direction and crossing the cross ribs, and each of the thickened portions may be provided at an intersection where a corresponding one of the cross ribs crosses a corresponding one of the longitudinal ribs.

In the above configuration, by providing the cross rib and the longitudinal rib as such, the rigidity of the vehicle body structure member can be improved. Further, by providing the thickened portion at the intersection between the cross rib and the longitudinal rib, the cross rib and the longitudinal rib can be reinforced, the rigidity of the vehicle body structure member can be further improved, and the deformation of the vehicle body structure member can be restrained.

With the above configuration, it is possible to yield such an effect that the rigidity of the vehicle body structure member can be improved, and the deformation of the vehicle body structure member can be restrained.

In the above aspect, the vehicle body structure member may be disposed along the vehicle front-rear direction. The vehicle body structure member may have an arch shape curving along a vehicle up-down direction or curving along a vehicle width direction. The thickened portions may be provided in a bending portion on a large curvature side in the vehicle body structure member such that the thickened portions are adjacent to each other.

In the above configuration, the vehicle body structure member is disposed along the vehicle front-rear direction and has a so-called arch shape. On this account, when a collision load is input into the vehicle body structure member along the vehicle front-rear direction due to a front end collision of the vehicle (hereinafter referred to as "the front collision of the vehicle") or a rear end collision of the vehicle (hereinafter referred to as "the rear collision of the vehicle"), a bending moment is generated in the vehicle body structure member. In this case, in the vehicle body structure member having an arch shape, a tensile force acts on a bending portion on a small curvature side, and a compressive force acts on the bending portion on the large curvature side.

In the above configuration, the thickened portions are provided in the bending portion on the large curvature side in the vehicle body structure member such that the thickened portions are adjacent to each other. Hereby, when a compressive force acts on the bending portion, the thickened portions adjacent to each other interfere with each other, so that the deformation of the bending portion can be restrained.

With the above configuration, it is possible to yield such an effect that the deformation of the bending portion on the large curvature side can be restrained at the time when a collision load is input, and bending deformation of the vehicle body structure member can be effectively restrained.

In the above aspect, the vehicle body structure member may further include a side wall portion provided in a standing manner from an outer edge of the general portion and connected to the ribs. The thickened portions may be provided integrally with the side wall portion.

In the above configuration, the vehicle body structure member includes the side wall portion connected to the rib and provided in a standing manner from the outer edge of the general portion, and the thickened portion is provided integrally with the side wall portion. In the vehicle body structure member, when the side wall portion is provided as such, the rigidity of the vehicle body structure member can be further improved, and the deformation of the vehicle body structure member can be further restrained.

Here, in a case where the side wall portion connected to the rib is provided in a standing manner from the outer edge of the general portion, a material flows from the general portion and the side wall portion into the rib at the time of molding the vehicle body structure member. That is, in the above aspect, the general portion and the side wall portion are formed by "main flow." Accordingly, in the above aspect, "general portion" in the vehicle body structure member is a concept also including "side wall portion" in the above aspect.

With the configuration, it is possible to yield such an effect that the rigidity of the vehicle body structure member can be further improved, and the deformation of the vehicle body structure member can be further restrained.

In the above aspect, each of the thickened portions may include an ejector pin seat with which an ejector member projecting from the die abuts such that the ejector member presses the ejector pin seat in a state where the die is opened so as to release the vehicle body structure member from the die.

In the above configuration, the thickened portion includes a so-called ejector pin seat. Accordingly, when the ejector member projecting from the die abuts with the ejector pin seat so as to press the ejector pin seat in a state where the die is opened, the vehicle body structure member is released from the die via the ejector pin seat.

That is, in the above configuration, the ejector pin seat is provided to release the vehicle body structure member from the die. On this account, when the thickened portion provided to restrain misrun and disposed at the branch portion where the material shifts from the main flow flowing through the general portion of the vehicle body structure member to the branch flow flowing through the rib doubles as the ejector pin seat, it is possible to reduce the weight of the vehicle body structure member in comparison with a case where the thickened portion is provided separately from the ejector pin seat.

With the above configuration, it is possible to yield such an effect that the rigidity of the vehicle body structure member can be improved, and the vehicle body structure member can be reduced in weight.

In the above aspect, each of the thickened portions may be formed in a branch portion at which a material for forming the vehicle body structure member shifts from a main flow forming the general portion to a branch flow forming a corresponding one of the ribs in the die at a time when the vehicle body structure member is molded.

In the above configuration, the vehicle body structure member is molded by the die. The rib and the thickened portion thicker than the rib are provided in a standing manner from the general portion constituting the main part of the vehicle body structure member. Here, the thickened portion is placed at a branch portion at which a material for forming the vehicle body structure member shifts from a main flow forming the general portion to a branch flow forming the rib in the die at the time when the vehicle body structure member is molded.

Generally, in a molded product, when a material flows in a die from a main flow forming a general portion constituting a main part of the molded product to a branch flow forming a rib or the like thinner than the general portion at the time when the material is filled into the die via a pouring gate provided in the die, a passage for the material becomes narrow.

This accordingly causes a poor run (so-called misrun), so that defects such as shrinkage cavity might occur in the molded product.

On this account, in the present disclosure, the thickened portion formed to be thicker than the rib is provided at the branch portion where the material shifts from the main flow flowing through the general portion of the vehicle body structure member to the branch flow flowing through the rib. This can restrain the misrun. As a result, it is possible to prevent defects of the vehicle body structure member due to shrinkage cavity or the like, to restrain bending deformation at the time of the input of a collision load, and to prevent cracks or breakage at the time of the input of a collision load.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes a vehicle body structure member according to one embodiment of the present disclosure. Note that an arrow FR shown appropriately in each figure indicates the front side in the vehicle front-rear direction, and an arrow UP indicates the upper side in the vehicle up-down direction. Further, an arrow OUT indicates an outer side in the vehicle width direction. Hereinafter, in a case where a description is made by use of merely directions of front and rear, right and left, and up and down, they indicate front and rear in the vehicle front-rear direction, right and left in the vehicle right-left direction (the vehicle width direction), and up and down in the vehicle up-down direction, respectively, unless otherwise specified.

Configuration of Vehicle Body Structure Member

First described is a configuration of a vehicle to which a vehicle body structure member according to the present embodiment is applied.

Figure 1:
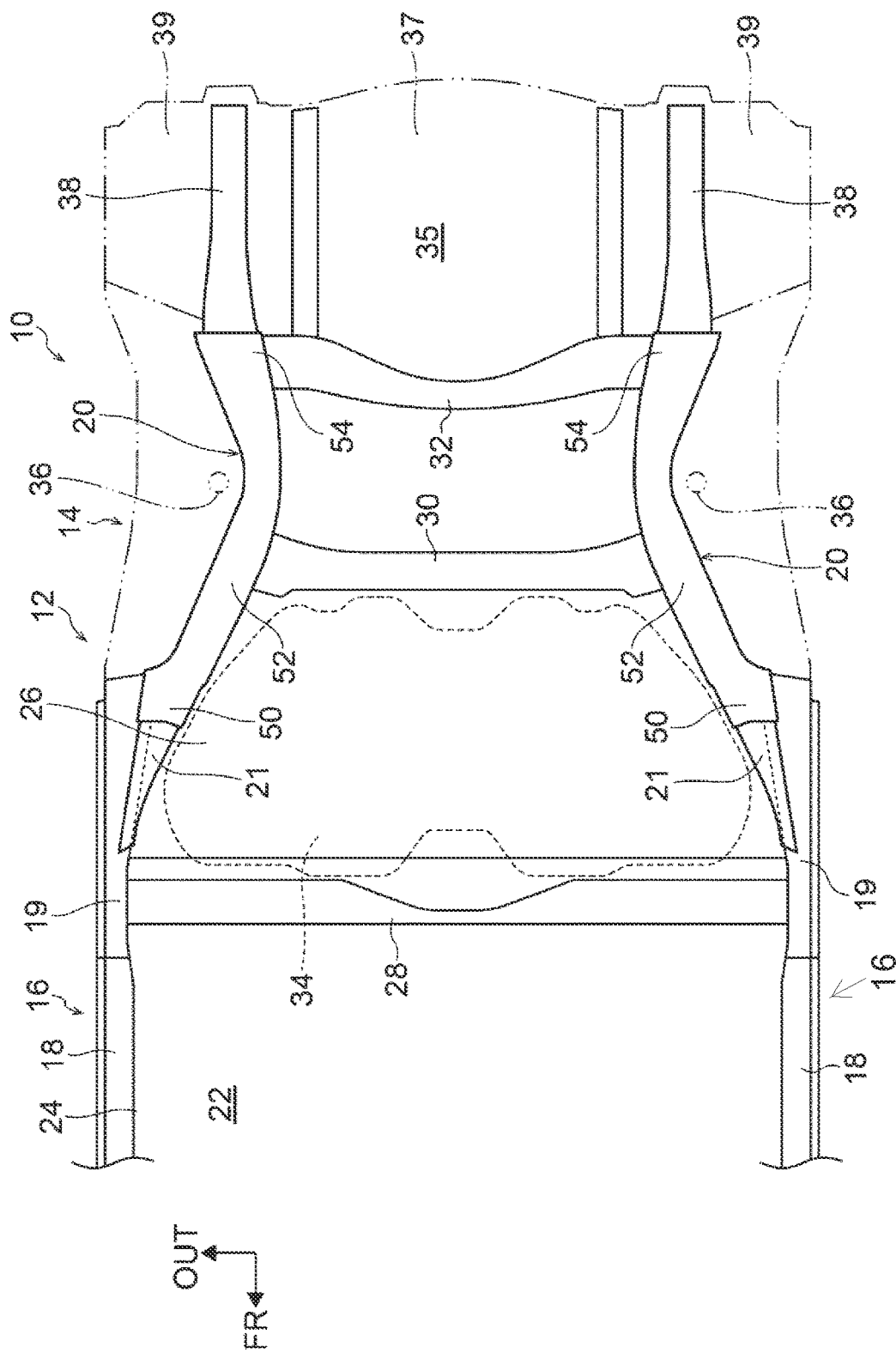
FIG. 1 is a plan view illustrating a rear portion side of a vehicle lower portion including a rear-floor side member to which a vehicle body structure member according to one embodiment of the present disclosure is applied.

FIG. 1 is a plan view illustrating a rear portion (hereinafter referred to as "vehicle rear portion") 14 side of a vehicle 10 in a lower portion (hereinafter referred to as "vehicle lower portion") 12 of the vehicle 10 to which a vehicle body structure member according to the present embodiment is applied.

As illustrated in FIG. 1, right and left rockers 18 extending longitudinally in the vehicle front-rear direction are provided in respective side portions (hereinafter referred to as "vehicle side portion") 16 of the vehicle 10. Sectional shapes of the right and left rockers 18 when the rockers 18 are cut along directions (the vehicle up-down direction and the vehicle width direction) perpendicular to the longitudinal direction of the rockers 18 are a closed section shape, and each of the rockers 18 constitutes a part of a framework of its corresponding vehicle side portion 16.

A floor panel 24 extending along the vehicle front-rear direction and the vehicle width direction and constituting a floor face of a vehicle cabin (cabin) 22 is provided between the right and left rockers 18, and the opposite ends of the floor panel 24 in the vehicle width direction are connected to the right and left rockers 18, respectively. Further, a floor cross member 28 is disposed on the rear side of the rockers 18 in the vehicle front-rear direction so as to extend along the vehicle width direction between the right and left rockers 18. The floor cross member 28 is connected to the upper side of the floor panel 24.

Further, rear-floor side members 20 are disposed behind the right and left rockers 18 in the vehicle front-rear direction so as to extend along the vehicle front-rear direction. A center floor panel 26 constituting a floor face on the rear side of the vehicle cabin 22 is provided between the right and left rear-floor side members 20. The center floor panel 26 is placed behind the floor panel 24 in the vehicle front-rear direction and extends along the vehicle front-rear direction and the vehicle width direction. The opposite end portions of the center floor panel 26 in the vehicle width direction are connected to the right and left rear-floor side members 20, respectively.

Further, in central parts 52 of the rear-floor side members 20 in the vehicle front-rear direction, a floor cross member 30 is disposed along the vehicle width direction between the right and left rear-floor side members 20, and the floor cross member 30 is connected to the upper side of the center floor panel 26.

Further, rear parts 54 of the rear-floor side members 20 in the vehicle front-rear direction are provided with a floor cross member 32 such that the floor cross member 32 is disposed along the vehicle width direction between the right and left rear-floor side members 20. Similarly to the floor cross member 30, the floor cross member 32 is also connected to the upper side of the center floor panel 26.

Note that a fuel tank 34 is disposed below the center floor panel 26 on front-part-50 sides of the right and left rear-floor side members 20 in the vehicle front-rear direction, that is, between the floor cross member 28 and the floor cross member 30. Further, although not illustrated herein, suspension towers 36 and so on to which a shock absorber is attached are provided outwardly from the right and left rear-floor side members 20 in the vehicle width direction.

Further, rear-floor side member rears 38 are extended along the vehicle front-rear direction behind the right and left rear-floor side members 20 in the vehicle front-rear direction. Further, a rear floor panel 37 extending along the vehicle front-rear direction and the vehicle width direction and constituting a floor face inside a trunk 35 is provided behind the center floor panel 26 in the vehicle front-rear direction. Respective rear floor side panels 39 extending along the vehicle front-rear direction and the vehicle width direction are provided on the opposite outer sides of the rear floor panel 37 in the vehicle width direction, and the right and left rear-floor side member rears 38 are connected to the rear-floor side panels 39, respectively.

Rear-Floor Side Members

The following describes the rear-floor side members 20 as the vehicle body structure member according to the present embodiment in detail. A basic configuration of the rear-floor side member 20 will be described first, and subsequently, a part of the rear-floor side member 20 will be described.

Basic Configuration of Rear-Floor Side Member

Figure 2:
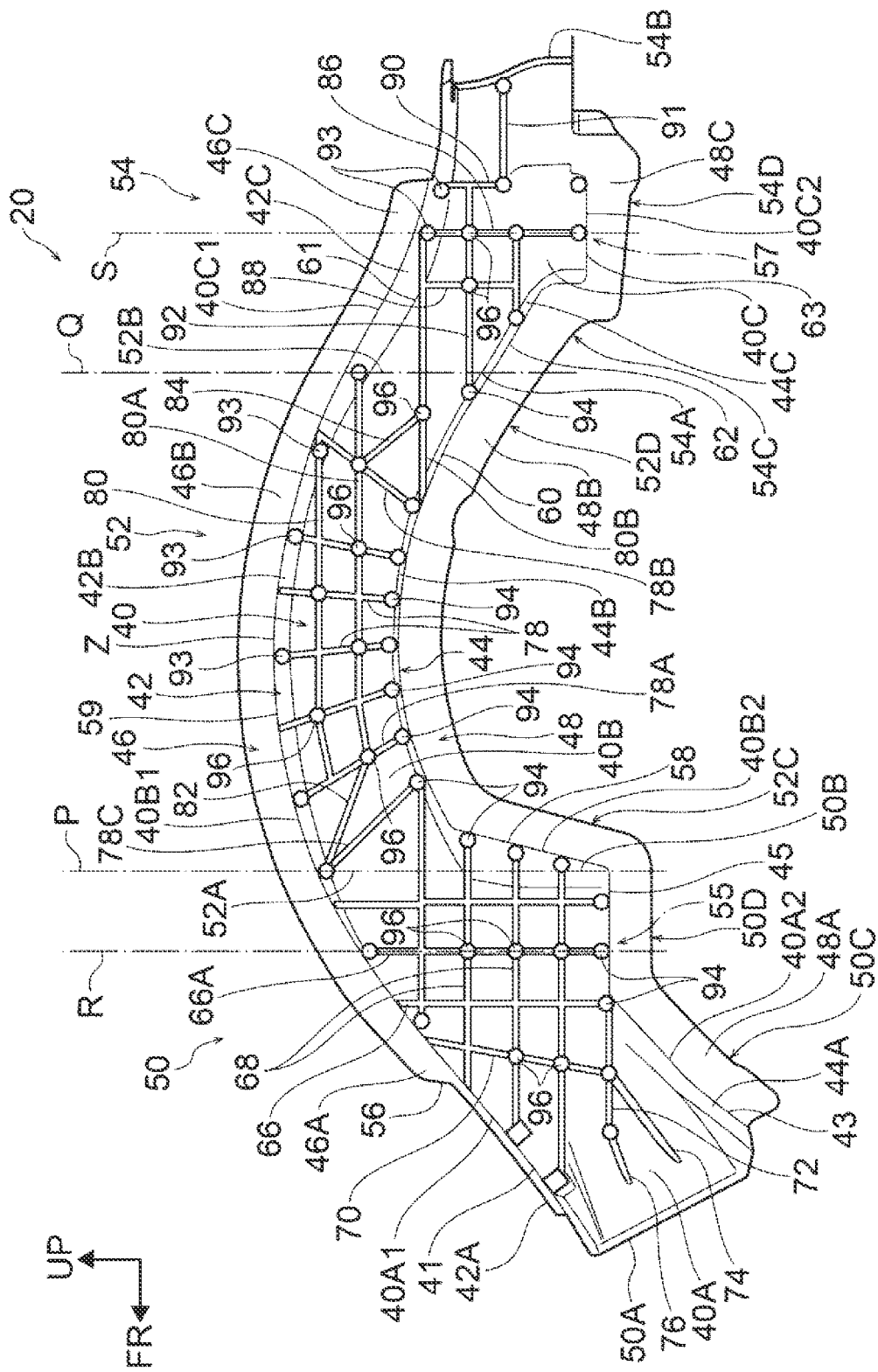
FIG. 2 is a side view illustrating the rear-floor side member to which the vehicle body structure member according to one embodiment of the present disclosure is applied.

As illustrated in FIG. 1, the rear-floor side member 20 curves to project inwardly in the vehicle width direction in a plan view, and as illustrated in FIG. 2, the rear-floor side member 20 curves to project upward in the vehicle up-down direction in a side view of the rear-floor side member 20 (a so-called arch shape). Note that FIG. 2 is a side view of the rear-floor side member 20.

The rear-floor side member 20 is formed by aluminum die-casting, and a die that is opened along the vehicle width direction of the rear-floor side member 20 is used. Further, the section of the rear-floor side member 20 taken along the vehicle up-down direction and the vehicle width direction has a hat shape having an opening that is opened outwardly in the vehicle width direction.

That is, briefly speaking, the rear-floor side member 20 is constituted by an inner wall portion (a general portion) 40 that constitutes a main part of the rear-floor side member 20, a pair of side wall portions 42, 44 provided in a standing manner from outer edges of the inner wall portion 40 such that the side wall portions 42, 44 face each other, and flange portions 46, 48 extending from respective distal ends of the side wall portions 42, 44.

For purposes of this description, the rear-floor side member 20 will be described by dividing the rear-floor side member 20 into a front part 50, a central part 52, and a rear part 54 along the vehicle front-rear direction. Note that, in the rear-floor side member 20 illustrated in FIG. 2, a straight line P illustrated along the up-down direction indicates a boundary between the front part 50 and the central part 52 of the rear-floor side member 20, and a straight line Q indicates a boundary between the central part 52 and the rear part 54 of the rear-floor side member 20. In the following description, the straight line P is referred to as "boundary line P," and the straight line Q is referred to as "boundary line Q."

Although not illustrated in the figure, so-called suspension member attachment portions 55, 57 to which respective suspension members are attached are provided respectively in the front part 50 and the rear part 54 of the rear-floor side member 20, and center lines R, S illustrated in the front part 50 and the rear part 54 indicate axial center lines of the suspension member attachment portions 55, 57, respectively. Hereinafter, the center line R is referred to as "axial center line R," and the center line S is referred to as "axial center line S."

Front Part of Rear-Floor Side Member

First described is the front part 50 of the rear-floor side member 20 (hereinafter referred to as "rear-floor side member front part 50").

As illustrated in FIG. 1, the rear-floor side member front part 50 is connected to the rocker 18 extending in the vehicle front-rear direction in the vehicle side portion 16. Note that a rocker rear 19 as a separate member may be provided in a rear part of the rocker 18 in the vehicle front-rear direction. Further, in the rear-floor side member 20, a connecting portion 21 to be connected to the rocker 18 may be separately provided in the rear-floor side member front part 50.

As illustrated in FIG. 2, the rear-floor side member front part 50 is constituted by an inner wall portion 40A, side wall portions 42A, 44A, and flange portions 46A, 48A. An upper end 40A1 of the inner wall portion 40A is provided with an inclined portion 41 inclined from a front end 50A to a rear end 50B of the rear-floor side member front part 50 so as to form a gradual curve toward the upper side in the vehicle up-down direction as it goes rearward in the vehicle front-rear direction.

In the meantime, in the rear-floor side member front part 50, a front part 50C side and a rear part 50D side of a bottom end 40A2 of the inner wall portion 40A in the vehicle front-rear direction have different shapes. More specifically, the front part 50C side of the bottom end 40A2 of the inner wall portion 40A is provided generally in parallel with the upper end 40A1 of the inner wall portion 40A and is provided with an inclined portion 43 inclined so as to form a gradual curve toward the upper side in the vehicle up-down direction as it goes rearward in the vehicle front-rear direction. On the other hand, the rear part 50D side of the bottom end 40A2 of the inner wall portion 40A is provided with a horizontal portion 45 extending generally along the horizontal direction toward the rear side in the vehicle front-rear direction.

The side wall portions 42A, 44A are provided outwardly in the vehicle width direction from the upper end 40A1 and the bottom end 40A2 of the inner wall portion 40A so as to extend along respective shapes of the upper end 40A1 and the bottom end 40A2. That is, the side wall portion 42A includes the inclined portion 41, and the side wall portion 44A includes the inclined portion 43 and the horizontal portion 45.

Further, the flange portion 46A is extended upward in the vehicle up-down direction from the distal end of the side wall portion 42A along the shape of the side wall portion 42A, and the flange portion 48A is extended downward in the vehicle up-down direction from the distal end of the side wall portion 44A along the shape of the side wall portion 44A. Note that, in the flange portion 46A, the front part 50C side of the rear-floor side member front part 50 is cut (a notch 56). Further, in the inclined portion 43 of the side wall portion 44A, the flange portion 48A extends rearward in the vehicle front-rear direction and downward in the vehicle up-down direction.

Central Part of Rear-Floor Side Member

Next will be described the central part 52 of the rear-floor side member 20 (hereinafter referred to as "rear-floor side member central part 52").

As illustrated in FIG. 2, the rear-floor side member central part 52 is constituted by an inner wall portion 40B, side wall portions 42B, 44B, and flange portions 46B, 48B. An upper end 40B1 of the inner wall portion 40B is provided with a curved portion 59 projecting upward in the vehicle up-down direction from a front end 52A to a rear end 52B of the rear-floor side member central part 52.

In the meantime, a bottom end 40B2 of the inner wall portion 40B is provided with a steep gradient portion 58 in a front part 52C of the rear-floor side member central part 52 such that the steep gradient portion 58 is sharply inclined upward in the vehicle up-down direction as it goes rearward in the vehicle front-rear direction. Further, the bottom end 40B2 of the inner wall portion 40B is provided with a curved portion 60 (a bending portion on a large curvature side in the vehicle body structure member) provided generally in parallel with the upper end 40B1 of the inner wall portion 40B from the steep gradient portion 58 to the rear end 52B of the rear-floor side member central part 52 such that the curved portion 60 projects upward in the vehicle up-down direction in a curved shape.

The side wall portions 42B, 44B are provided outwardly in the vehicle width direction from the upper end 40B1 and the bottom end 40B2 of the inner wall portion 40B so as to extend along respective shapes of the upper end 40B1 and the bottom end 40B2. That is, the side wall portion 42B includes the curved portion 59, and the side wall portion 44B includes the steep gradient portion 58 and the curved portion 60.

Further, the flange portion 46B is extended upward in the vehicle up-down direction from the distal end of the side wall portion 42B along the shape of the side wall portion 42B, and the flange portion 48B is extended downward in the vehicle up-down direction from the distal end of the side wall portion 44B along the shape of the side wall portion 44B. Note that, in the steep gradient portion 58 of the side wall portion 44B, the flange portion 48B is extended rearward in the vehicle front-rear direction and downward in the vehicle up-down direction.

Rear Part of Rear-Floor Side Member

Next will be described the rear part 54 of the rear-floor side member 20 (hereinafter referred to as "rear-floor side member rear part 54").

As illustrated in FIG. 1, the rear-floor side member rear part 54 is connected to the rear-floor side member rear 38 extending in the vehicle front-rear direction in the vehicle rear portion 14. As illustrated in FIG. 2, the rear-floor side member rear part 54 is constituted by an inner wall portion 40C, side wall portions 42C, 44C, and flange portions 46C, 48C. An upper end 40C1 of the inner wall portion 40C is provided with a curved portion 61 slightly projecting downward in the vehicle up-down direction from a front end 54A to a rear end 54B of the rear-floor side member rear part 54.

In the meantime, a bottom end 40C2 of the inner wall portion 40C is provided with an inclined portion 62 in a front part 54C of the rear-floor side member rear part 54 such that the inclined portion 62 is inclined downward in the vehicle up-down direction as it goes rearward in the vehicle front-rear direction. Further, the bottom end 40C2 of the inner wall portion 40C is provided with a horizontal portion 63 in a rear part 54D of the rear-floor side member rear part 54 such that the horizontal portion 63 extends generally along the horizontal direction as it goes rearward in the vehicle front-rear direction.

The side wall portions 42C, 44C are provided outwardly in the vehicle width direction from the upper end 40C1 and the bottom end 40C2 of the inner wall portion 40C so as to extend along respective shapes of the upper end 40C1 and the bottom end 40C2. That is, the side wall portion 42C includes the curved portion 61, and the side wall portion 44C includes the inclined portion 62 and the horizontal portion 63. Further, the flange portion 46C is extended upward in the vehicle up-down direction from the distal end of the side wall portion 42C along the shape of the side wall portion 42C, and the flange portion 48C extends downward in the vehicle up-down direction from the distal end of the side wall portion 44C along the shape of the side wall portion 44C.

Part of Rear-Floor Side Member

In the meantime, in the present embodiment, as illustrated in FIG. 2, the inner wall portion 40 is provided with plate-shaped longitudinal ribs (ribs) 66, 78, 86 and the like extended along the vehicle up-down direction and plate-shaped cross ribs (ribs) 68, 80, 92 and the like extended along the vehicle front-rear direction such that the longitudinal ribs 66, 78, 86 and the like and the cross ribs 68, 80, 92, and the like are disposed to extend from the side wall portion 42 to the side wall portion 44 and arranged generally perpendicularly to each other. Note that the longitudinal ribs 66, 78, 86 and the like and the cross ribs 68, 80, 92 and the like are set to have generally the same plate thickness. The longitudinal ribs 66, 78, 86, the cross ribs 68, 80, 92, and the like will be described below in detail.

Front Part of Rear-Floor Side Member

First described is the rear-floor side member front part 50 side (a region from the front end 50A of the rear-floor side member front part 50 to the front end 52A (the boundary line P) of the rear-floor side member central part 52).

A plurality of longitudinal ribs 66 is provided in the rear-floor side member front part 50. The longitudinal ribs 66 are disposed to extend from the side wall portion 42A to the horizontal portion 45 of the side wall portion 44A in the rear-floor side member front part 50. Here, a longitudinal rib 66A placed in the center among the longitudinal ribs 66 is provided at a position overlapping with the axial center line R of the aforementioned suspension member attachment portion 55 in a vehicle side view. Further, a longitudinal rib 70 is provided on the inclined portion 43 side of the side wall portion 44A, and the longitudinal rib 70 is disposed to extend from the side wall portion 42A to a cross rib 72 (described later).

Further, in the rear-floor side member front part 50, a plurality of cross ribs 68 is provided so as to be generally perpendicular to the aforementioned longitudinal ribs 66. The cross ribs 68 are extended from the rear-floor side member front part 50 to the front part 52C of the rear-floor side member central part 52 such that the cross ribs 68 are disposed to extend from the side wall portion 42A of the rear-floor side member front part 50 to the side wall portion 44B of the rear-floor side member central part 52.

Further, the front part 50C of the rear-floor side member front part 50 is provided with inclined ribs (ribs) 74, 76 between the side wall portion 42A and the side wall portion 44A such that the inclined ribs 74, 76 are placed generally in parallel with the side wall portions 42A, 44A. The inclined rib 74 is connected to the longitudinal rib 70 and the cross rib 72, and the inclined rib 76 is connected to the cross rib 72.

Central Part of Rear-Floor Side Member

Next will be described the rear-floor side member central part 52 side (a region from the front end 52A (the boundary line P) of the rear-floor side member central part 52 to the front end 54A (the boundary line Q) of the rear-floor side member rear part 54).

A plurality of longitudinal ribs 78 is provided in the rear-floor side member central part 52. The longitudinal ribs 78 are provided near a top Z of the rear-floor side member central part 52 at predetermined intervals along the vehicle front-rear direction. The longitudinal ribs 78 are disposed to extend from the side wall portion 42B to the side wall portion 44B in the rear-floor side member central part 52 and are placed so as to extend radially from generally the center of curvature of the curved portion 60 of the side wall portion 44B.

A plurality of cross ribs 80 is disposed to extend from a longitudinal rib 78A placed on the front side to a longitudinal rib 78B placed on the rear side among the longitudinal ribs 78. A longitudinal rib 78C is provided in front of the longitudinal rib 78A, and the longitudinal rib 78C is disposed to extend from the side wall portion 42B to the side wall portion 44B. Further, an inclined rib (rib) 82 connected to the side wall portion 42B and inclined downward in the vehicle up-down direction as it goes rearward in the vehicle front-rear direction is disposed to extend from the longitudinal rib 78C to the longitudinal rib 78A. Note that the inclined rib 82 is also connected to the side wall portion 42B and a cross rib 80A (described later).

In the meantime, among the cross ribs 80, the cross rib 80A placed in the center of the rear-floor side member central part 52 in the vehicle up-down direction extends to the side wall portion 42B across the longitudinal rib 78B. Further, a cross rib 80B placed below the cross rib 80A extends from the side wall portion 44B to the side wall portion 42C of the rear-floor side member rear part 54 (described later). Note that an inclined rib (rib) 84 connected to the longitudinal rib 78B and inclined downward in the vehicle up-down direction as it goes rearward in the vehicle front-rear direction is disposed to extend form the cross rib 80A to the cross rib 80B.

Rear Part of Rear-Floor Side Member

Next will be described the rear-floor side member rear part 54 side (a region from the front end 54A to the rear end 54B of the rear-floor side member rear part 54).

A longitudinal rib (rib) 86 is provided in the rear-floor side member rear part 54. The longitudinal rib 86 is disposed to extend from the side wall portion 42C to the side wall portion 44C in the rear-floor side member rear part 54. Here, the longitudinal rib 86 is provided at a position overlapping with the axial center line S of the aforementioned suspension member attachment portion 57 in a vehicle side view. Further, longitudinal ribs 88, 90 are provided in front of and behind the longitudinal rib 86. The longitudinal rib 88 is disposed to extend from the side wall portion 42C to the cross rib 92 (described below), and the longitudinal rib 90 is disposed to extend from the side wall portion 42C to a cross rib 91 (described below).

Further, in the rear-floor side member rear part 54, a plurality of cross ribs 92 is provided so as to be generally perpendicular to the aforementioned longitudinal ribs 86, 88, 90. Some of the cross ribs 92 are provided from a rear part 52D of the rear-floor side member central part 52 to the front part 54C of the rear-floor side member rear part 54. That is, the cross ribs 92 are disposed to extend from the side wall portion 44B of the rear-floor side member central part 52 to the side wall portion 42C of the rear-floor side member rear part 54. Further, the cross ribs 91, 92 are provided so as to connect the longitudinal ribs 86, 88, 90 between the side wall portion 42C and the side wall portion 44C.

In the meantime, in the present embodiment, the rear-floor side member 20 is formed by aluminum die-casting as described above, and a die (not shown) for molding the rear-floor side member 20 is configured to be opened along the vehicle width direction in the rear-floor side member 20.

The rear-floor side member 20 is molded by the die, and the rear-floor side member 20 is released from the die in a state where the die is opened. Accordingly, a movable die side constituting a part of the die is provided with ejector pins, although not illustrated herein. When the ejector pins abut with the rear-floor side member 20 and presses the rear-floor side member 20, the rear-floor side member 20 is released from the movable die.

On this account, the rear-floor side member 20 is provided with ejector pin seats with which the ejector pins abut. More specifically, in the present embodiment, a plurality of columnar ejector pin seats 93, 94, 96 is provided in a standing manner from the inner wall portion 40 of the rear-floor side member 20. Note that the diameters of the ejector pin seats 93, 94, 96 are set to be larger than the plate thicknesses of the longitudinal ribs 66, 78, 86 and the cross ribs 68, 80, 92 and the like.

The ejector pin seats (thickened portions) 93 are provided at least at intersections of the longitudinal ribs 66A, 86 with the side wall portion 42 and also at intersections of other longitudinal ribs 66, 78 or the cross ribs 68, 80, 92 with the side wall portion 42. The ejector pin seats 93 are provided integrally with the side wall portion 42.

Further, the ejector pin seats (thickened portions) 94 are provided at least at intersections of the longitudinal ribs 66A, 86 with the side wall portion 44 and also at intersections of other longitudinal ribs 66, 78 or the cross ribs 68, 72, 92 with the side wall portion 44. The ejector pin seats 94 are provided integrally with the side wall portion 44.

Further, the ejector pin seats 96 are provided at some intersections among a plurality of intersections where the longitudinal ribs 66, 70 cross the cross ribs 68, some intersections among a plurality of intersections where the longitudinal ribs 78 cross the cross ribs 80, and so on.

As described above, the ejector pin seats 93 are provided integrally with the side wall portion 42, and the ejector pin seats 94 are provided integrally with the side wall portion 44. Accordingly, the ejector pin seats 93, 94 are thicker than the ejector pin seats 96.

Here, as described above, the rear-floor side member 20 is disposed along the vehicle front-rear direction and has an arch shape curving along the vehicle up-down direction. On this account, in the present embodiment, in the rear-floor side member 20, the ejector pin seats 94 are provided in the curved portion 60 on the large curvature side so as to be adjacent to each other along the curvature of the curved portion 60.

Further, although not illustrated herein, a notch may be formed in the flange portion 48 of the rear-floor side member 20 so as to avoid interference with a pipe for fuel. The notch is vulnerable as compared to a part where the notch is not formed. Accordingly, in a case where the notch is formed, the ejector pin seats 94 are placed right above the notch.

Operations and Effects of Vehicle Body Structure Member

Next will be described operations and effects of the vehicle body structure member according to the present embodiment.

In the present embodiment, the rear-floor side member 20 illustrated in FIG. 2 is formed by aluminum die-casting. Generally, a die-casting member formed by die-casting has high design flexibility, and therefore, the die-casting member is formed such that some parts are thickened so that high rigidity is obtained. However, when the thickness is increased, the weight of the vehicle increases.

On this account, in the present embodiment, in the rear-floor side member 20, the longitudinal ribs 66, 78, 86 and the like extended along the vehicle up-down direction and the cross ribs 68, 80, 92 and the like extended along the vehicle front-rear direction are provided between the side wall portion 42 and the side wall portion 44 provided to face each other, so as to reinforce the rear-floor side member 20 with a minimum thickness.

Further, in the present embodiment, the diameters of the ejector pin seats 93, 94, 96 are set to be larger than the plate thicknesses of the longitudinal ribs 66, 78 and the cross ribs 68, 80 and the like. Further, the ejector pin seats 93 are provided integrally with the side wall portion 42, and the ejector pin seats 94 are provided integrally with the side wall portion 44. On this account, the ejector pin seats 93, 94 are thicker than the ejector pin seats 96 placed inwardly from the ejector pin seats 93, 94, that is, between the side wall portion 42 and the side wall portion 44.

Figure 3:
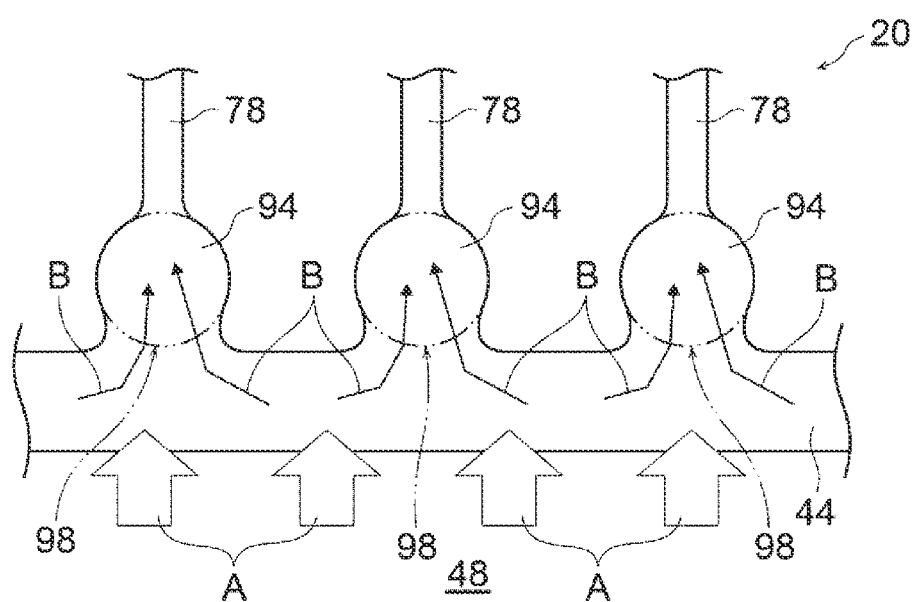
FIG. 3 is a plan view to describe a main flow and a branch flow flowing through a side wall portion and a longitudinal rib, respectively, in the rear-floor side member to which the vehicle body structure member according to one embodiment of the present disclosure is applied.

In the present embodiment, as illustrated in FIG. 3, for example, the ejector pin seats 94 are placed at branch portions 98 where a material for forming the rear-floor side member 20 shifts from a main flow A where the material flows through the side wall portion 44 from the flange portion 48 of the rear-floor side member 20 to a branch flow B where the material flows through the longitudinal ribs 78 at the time of molding the rear-floor side member 20, and the ejector pin seats 94 are formed to be thicker than the longitudinal ribs 78. Note that FIG. 3 is a plan view to describe the main flow A and the branch flow B flowing through the side wall portion 44 and the longitudinal ribs 78, respectively, in the rear-floor side member 20. In the present embodiment, the outer end side of the flange portion 48 serves as a pouring gate via which the material is filled from the die. Here, in FIG. 3, the side wall portion 44 corresponds to "general portion" described in the claims.

Generally, although not illustrated herein, in a molded product molded by a die, a material for forming the molded product is filled via a pouring gate formed in the die when the material is filled into the die. However, it is desirable that a passage for filling the material into a hollow portion (hereinafter referred to as "cavity") formed in the die be uniform in each section of the molded product. That is, it is desirable that the thickness in each section of the molded product be generally uniform. In the meantime, the molded product can be formed in a complicated shape, so the thickness in each section of the molded product is often not uniform.

Figure 5:
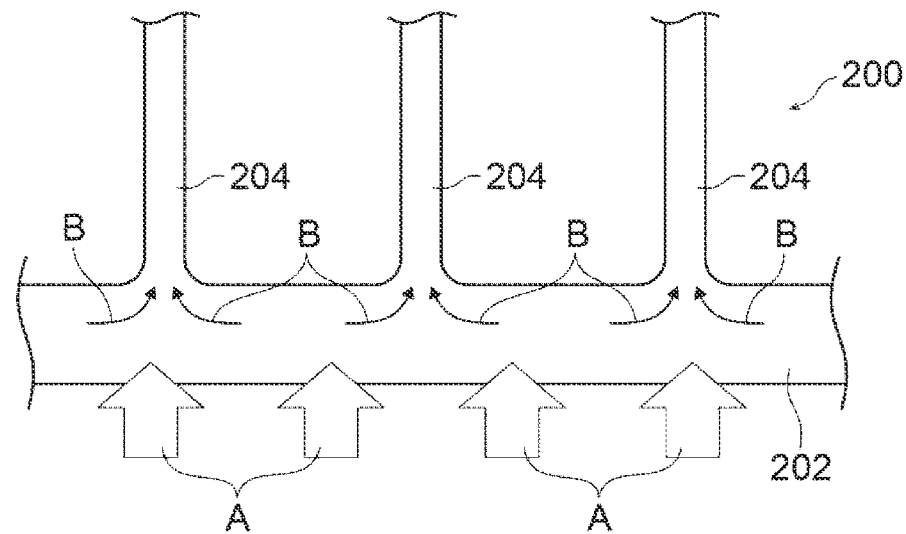
FIG. 5 is a plan view illustrating a comparative example and corresponding to FIG. 3.
Figure 6:
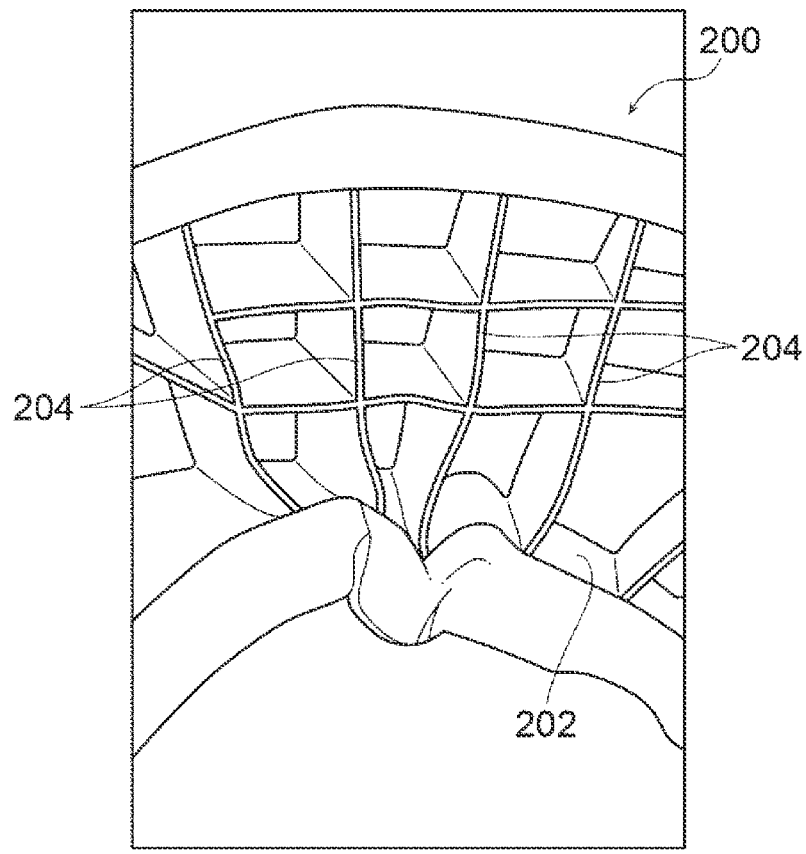
FIG. 6 is a part enlarged perspective view illustrating a comparative example and corresponding to FIG. 4.

On this account, in a case where the material is tilled into the die via the pouring gate in the molded product, when the material flows from a general portion 202 of a molded product 200 to a rib 204 as illustrated in FIG. 5, the passage becomes narrow suddenly. This causes a poor run (so-called misrun), so that defects such as shrinkage cavity might occur in the molded product 200. As a result, when a collision load is input, the molded product 200 might greatly bend and deform as illustrated in FIG. 6. Note that FIG. 5 is a plan view to describe a main flow A and a branch flow B flowing in the molded product 200 as a comparative example. FIG. 6 is a part enlarged perspective view illustrating a state where the molded product 200 as the comparative example bends and deforms.

In contrast, in the present embodiment, as illustrated in FIG. 3, the ejector pin seats 94 formed to be thicker than the longitudinal ribs 78 are provided at the branch portions 98 where the material shifts from the main flow A flowing through the side wall portion 44 of the rear-floor side member 20 to the branch flow B flowing through the longitudinal ribs 78, thereby making it possible to restrain misrun. This makes it possible to prevent defects in the rear-floor side member 20 due to shrinkage cavity or the like, to restrain bending deformation at the time of the input of a collision load, and to prevent cracks or breakage at the time of the input of a collision load.

Further, in the present embodiment, as illustrated in FIG. 2, in the rear-floor side member 20, the cross ribs 68, 80, 92, and the like are extended along the vehicle front-rear direction, and the longitudinal ribs 66, 78, 86, and the like are extended along the vehicle up-down direction. Further, the cross ribs 68, 80, 92 cross the longitudinal ribs 66, 78, 86, and the ejector pin seats 96 are provided at an intersection where the cross rib 68 crosses the longitudinal rib 66, at an intersection where the cross rib 80 crosses the longitudinal rib 78, and at an intersection where the cross rib 92 crosses the longitudinal rib 86.

When the cross ribs 68, 80, 92, and the like and the longitudinal ribs 66, 78, 86, and the like are provided in the rear-floor side member 20 as such, the rigidity of the rear-floor side member 20 can be improved. Further, when the ejector pin seats 96 are provided at the intersection where the cross rib 68 crosses the longitudinal rib 66, at the intersection where the cross rib 80 crosses the longitudinal rib 78, and at the intersection where the cross rib 92 crosses the longitudinal rib 86, it is possible to reinforce the cross ribs 68, 80, 92 and the longitudinal ribs 66, 78, 86. Hereby, the rigidity of the rear-floor side member 20 can be further improved, and the deformation of the rear-floor side member 20 can be restrained.

Further, in the present embodiment, as illustrated in FIG. 2, the rear-floor side member 20 is disposed along the vehicle front-rear direction and has an arch shape curving along the vehicle up-down direction. In the rear-floor side member 20, the ejector pin seats 94 are provided in the curved portion 60 on the large curvature side so as to be adjacent to each other along the curvature of the curved portion 60.

As described above, the rear-floor side member 20 is disposed along the vehicle front-rear direction and has a so-called arch shape. Accordingly, when a collision load is input into the rear-floor side member 20 along the vehicle front-rear direction due to a front collision of the vehicle or a rear collision of the vehicle, a bending moment occurs in the rear-floor side member 20. In this case, in the rear-floor side member 20 having an arch shape, a tensile force acts on the curved portion 59 on a small curvature side, and a compressive force acts on the curved portion 60 on the large curvature side.

Figure 4:
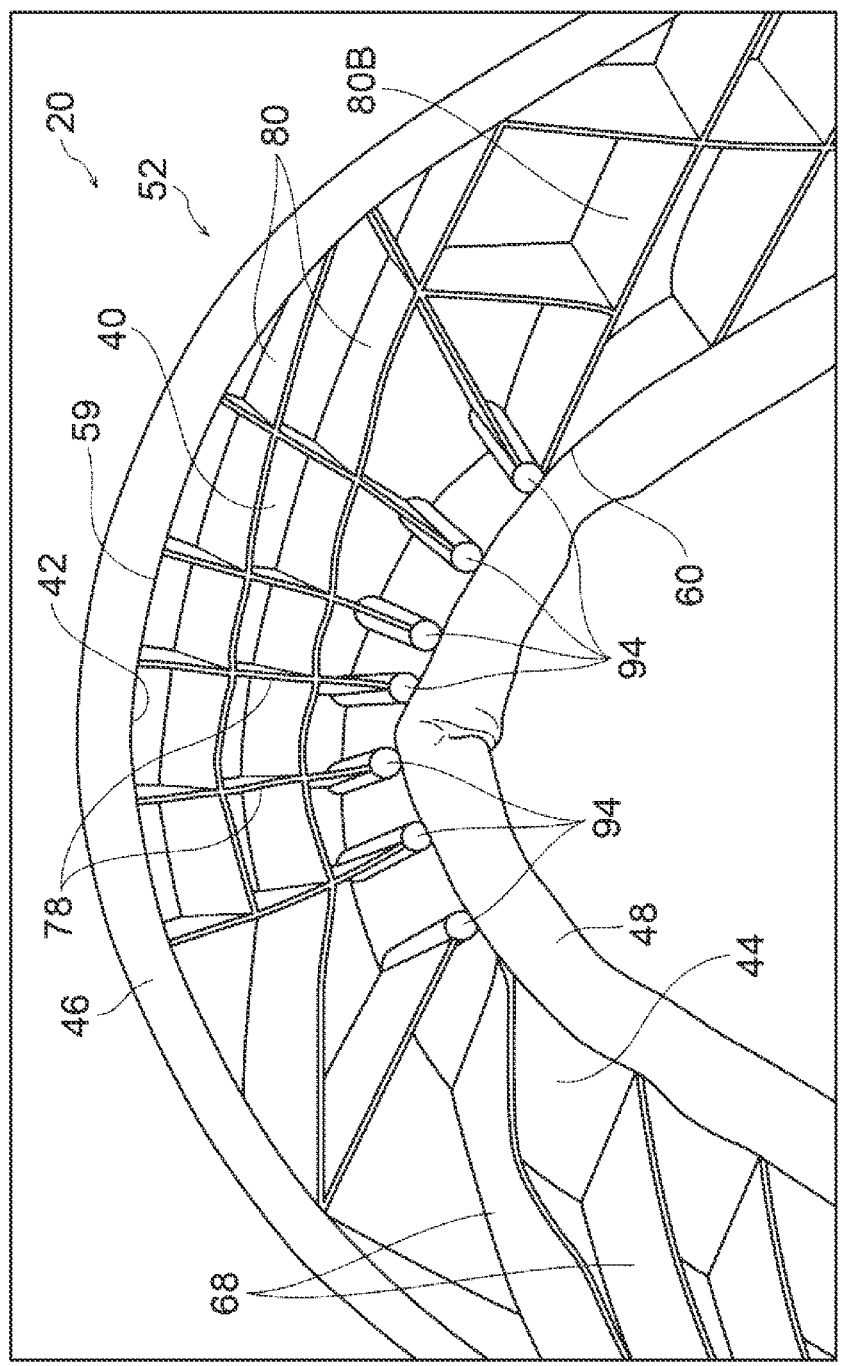
FIG. 4 is a part enlarged perspective view illustrating, in an enlarged manner, a part of the rear-floor side member to which the vehicle body structure member according to one embodiment of the present disclosure is applied.

On this account, as described above, in the present embodiment, in the curved portion 60 on the large curvature side in the rear-floor side member 20, the ejector pin seats 94 are provided so as to be adjacent to each other along the curvature of the curved portion 60, as illustrated in FIG. 4. Hereby, when a compressive force acts on the curved portion 60, the ejector pin seats 94 adjacent to each other interfere with each other, thereby making it possible to restrain the deformation of the curved portion 60. This makes it possible to effectively restrain bending deformation of the rear-floor side member 20. Note that FIG. 4 is a part enlarged perspective view illustrating, in an enlarged manner, the rear-floor side member central part 52 as a part of the rear-floor side member 20.

Further, in the present embodiment, in the rear-floor side member 20, the side wall portions 42, 44 connected to the cross ribs 68, 80, 92, the longitudinal ribs 66, 78, 86, and the like are provided in a standing manner from the outer edges of the inner wall portion 40, and the ejector pin seats 93, 94 are provided integrally with the side wall portions 42, 44, respectively. When the side wall portions 42, 44 are provided in the rear-floor side member 20 as such, it is possible to further improve the rigidity of the rear-floor side member 20 and to further restrain the deformation of the rear-floor side member 20.

Furthermore, in the present embodiment, a thickened portion is a so-called ejector pin seat. On this account, when ejector members projecting from the die (not shown) abut with the ejector pin seats 93, 94 so as to press the ejector pin seats 93, 94 in a state where the die is opened at the time when the rear-floor side member 20 is molded, the rear-floor side member 20 is released from the die via the ejector pin seats 93, 94.

That is, in order to release the rear-floor side member 20 from the die, the ejector pin seats 93, 94 are provided in the rear-floor side member 20. On this account, as illustrated in FIG. 3, the thickened portions provided to restrain misrun and disposed at the branch portions 98 where the material shifts from the main flow A flowing through the side wall portion 44 of the rear-floor side member 20 to the branch flow B flowing through the longitudinal ribs 78 double as the ejector pin seats 94. Accordingly, it is possible to reduce the weight of the rear-floor side member 20 in comparison with a case where the thickened portions are provided separately from the ejector pin seats 94.

That is, in the present embodiment, the rigidity of the rear-floor side member 20 can be improved, and the rear-floor side member 20 can be reduced in weight. Note that, in the present embodiment, the outer end side of the flange portion 48 of the rear-floor side member 20 illustrated in FIG. 2 serves as a pouring gate via which the material is filled from the die. However, the pouring gate is not limited to this. For example, the outer end side of the flange portion 48 and the outer end side of the flange portion 46 in the rear-floor side member 20 may serve as pouring gates.

Figure 7:
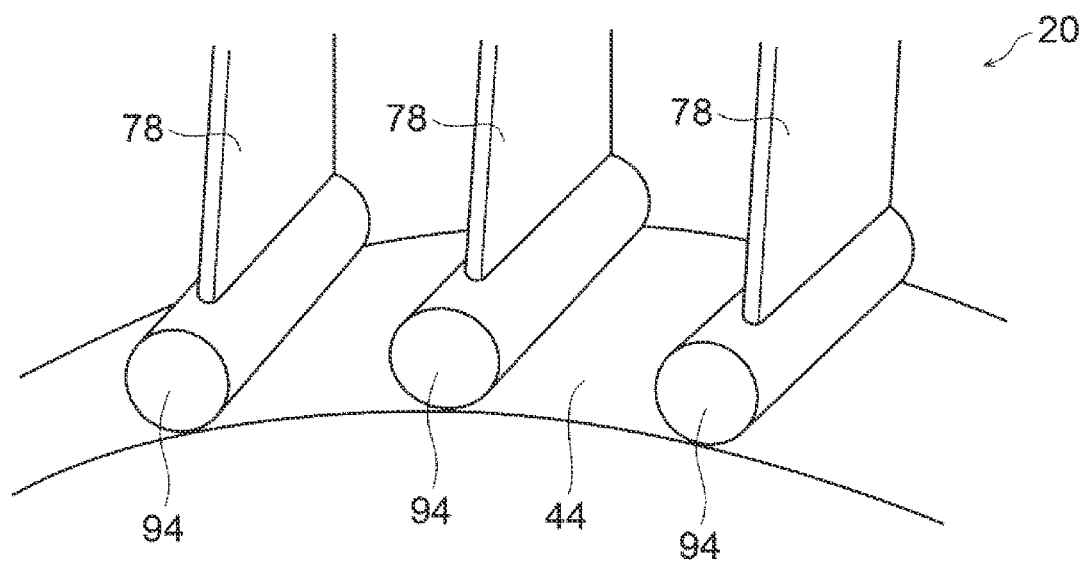
FIG. 7 is a part enlarged perspective view illustrating, in a further enlarged manner, the essential part of the rear-floor side member to which the vehicle body structure member according to one embodiment of the present disclosure is applied.
Figure 8:
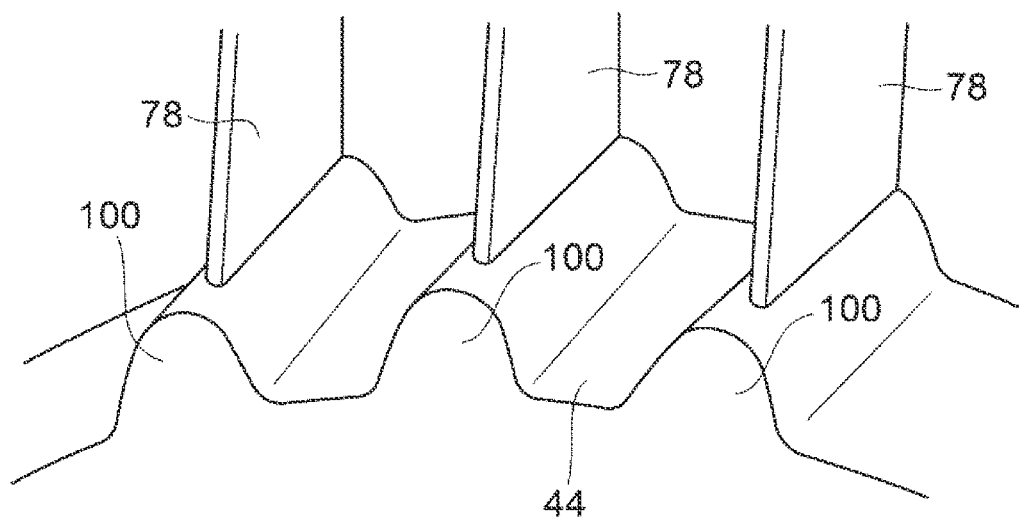
FIG. 8 is a part enlarged perspective view corresponding to FIG. 7 and illustrating a modification of the rear-floor side member to which the vehicle body structure member according to one embodiment of the present disclosure is applied.

Further, in the present embodiment, as illustrated in FIG. 7, the ejector pin seats 94 are provided integrally with the side wall portion 44 of the rear-floor side member 20 as the thickened portions connected to the longitudinal ribs 78, and the ejector pin seats 94 have a columnar shape. However, the ejector pin seats are not limited to this. For example, as illustrated in FIG. 8, ejector pin seats 100 may not necessarily be columnar. Further, the thickened portions connected to the longitudinal ribs 78 should be formed to be thicker than the longitudinal ribs 78, but the thickened portions may not necessarily be ejector pin seats with which the ejector pins of the die abut. Note that FIG. 7 is a part enlarged perspective view illustrating, in a further enlarged manner, the part of the rear-floor side member 20, and FIG. 8 is a part enlarged perspective view corresponding to FIG. 7.

Supplementary Matter of Present Embodiment

In the present embodiment, the rear-floor side member 20 is formed by aluminum die-casting, but the rear-floor side member 20 is not limited to aluminum and may be a die-casting product made of alloy of zinc, magnesium, copper, or the like or may be made of a casting. Further, the rear-floor side member 20 may be formed by molding fiber reinforced resin (FRP).

Further, in the present embodiment, the rear-floor side member 20 has an arch shape curving along the vehicle up-down direction. However, the rear-floor side member 20 may have an arch shape curving along the vehicle width direction, and further, the rear-floor side member 20 may not necessarily have an arch shape.

Further, in the present embodiment, the ejector pin seats 93 are provided integrally with the side wall portion 42, and the ejector pin seats 94 are provided integrally with the side wall portion 44. However, the side wall portions 42, 44 may not necessarily be provided.

Further, the present embodiment deals with the rear-floor side member 20. However, the present disclosure should be a vehicle body structure member and is not limited to this. For example, the present disclosure may be applied to a tunnel portion, the floor cross member 28 (see FIG. 1), or the like other than the side member.

One embodiment of the present disclosure has been explained as above, but it should be understood that the embodiment of the present disclosure is not limited to the above embodiment, and one embodiment and various modifications may be employed in combination appropriately, or the present disclosure may be performable in various aspects without departing from the gist of the present disclosure.

What is claimed is:

1. A vehicle body structure member molded by a die, the vehicle body structure member comprising:
   a general portion constituting a main part of the vehicle body structure member;

ribs provided in a standing manner from the general portion; and thickened portions provided in a standing manner from the general portion, each of the thickened portions being thicker than each of the ribs, each of the thickened portions include an ejector pin seat with which an ejector member projecting from the die abuts such that the ejector member presses the ejector pin seat in a state where the die is opened so as to release the vehicle body structure member from the die, wherein:

the ribs include cross ribs extended along a vehicle front-rear direction and longitudinal ribs extended along a vehicle up-down direction and crossing the cross ribs; and each of the thickened portions is provided at an intersection where a corresponding one of the cross ribs crosses a corresponding one of the longitudinal ribs.

2. The vehicle body structure member according to claim 1, wherein:

the vehicle body structure member is disposed along a vehicle front-rear direction;

the vehicle body structure member has an arch shape curving along a vehicle up-down direction or curving along a vehicle width direction; and the thickened portions are provided in a bending portion on a large curvature side in the vehicle body structure member such that the thickened portions are adjacent to each other.

3. The vehicle body structure member according to claim 1, further comprising a side wall portion provided in a standing manner from an outer edge of the general portion and connected to the ribs, wherein the thickened portions are provided integrally with the side wall portion.

4. The vehicle body structure member according to claim 1, wherein each of the thickened portions is formed in a branch portion at which a material for forming the vehicle body structure member shifts from a main flow forming the general portion to a branch flow forming a corresponding one of the ribs in the die at a time when the vehicle body structure member is molded.

5. A vehicle body structure member molded by a die, the vehicle body structure member comprising:

a general portion constituting a main part of the vehicle body structure member;

ribs provided in a standing manner from the general portion; and thickened portions provided in a standing manner from the general portion, each of the thickened portions being thicker than each of the ribs, wherein the ribs include cross ribs extending in a vehicle front-rear direction and longitudinal ribs extending in a vehicle up-down direction and crossing the cross ribs, and each of the thickened portions is provided at an intersection where a corresponding one of the cross ribs crosses a corresponding one of the longitudinal ribs.

6. The vehicle body structure member according to claim 5, wherein:

the vehicle body structure member is disposed along the vehicle front-rear direction;

the vehicle body structure member has an arch shape curving along the vehicle up-down direction or curving along a vehicle width direction; and the thickened portions are provided in a bending portion on a large curvature side in the vehicle body structure member such that the thickened portions are adjacent to each other.

7. The vehicle body structure member according to claim 5, further comprising a side wall portion provided in a standing manner from an outer edge of the general portion and connected to the ribs, wherein the thickened portions are provided integrally with the side wall portion.

8. The vehicle body structure member according to claim 5, wherein each of the thickened portions is formed in a branch portion at which a material for forming the vehicle body structure member shifts from a main flow forming the general portion to a branch flow forming a corresponding one of the ribs in the die at a time when the vehicle body structure member is molded.

* * * * *